United States Patent
Fayle et al.

(10) Patent No.: US 9,650,264 B2
(45) Date of Patent: May 16, 2017

(54) FLUID CONDITIONING

(71) Applicant: CALCLEAR INVESTMENTS PTY LIMITED, Brookvale, New South Wales (AU)

(72) Inventors: Robyn Anne Fayle, Manly (AU); Stephen Thomson, Greystanes (AU)

(73) Assignee: Calclear Investments Pty Limited, Brookvale (AU)

( * ) Notice: Subject to any disclaimer, the term of this patent is extended or adjusted under 35 U.S.C. 154(b) by 41 days.

(21) Appl. No.: 14/389,517

(22) PCT Filed: Mar. 26, 2013

(86) PCT No.: PCT/AU2013/000305
§ 371 (c)(1),
(2) Date: Sep. 30, 2014

(87) PCT Pub. No.: WO2013/149287
PCT Pub. Date: Oct. 10, 2013

(65) Prior Publication Data
US 2015/0090593 A1     Apr. 2, 2015

(30) Foreign Application Priority Data

Apr. 2, 2012     (AU) ................................ 2012901312

(51) Int. Cl.
*C02F 1/46* (2006.01)
*C02F 1/48* (2006.01)
(Continued)

(52) U.S. Cl.
CPC ............ *C02F 1/4602* (2013.01); *B01D 65/08* (2013.01); *C02F 1/487* (2013.01); *E21B 41/02* (2013.01);
(Continued)

(58) Field of Classification Search
None
See application file for complete search history.

(56) References Cited

U.S. PATENT DOCUMENTS 4,865,747 A * 9/1989 Larson .................... C02F 1/487
                                                    210/222
4,963,268 A 10/1990 Morse
(Continued)

FOREIGN PATENT DOCUMENTS

WO     WO-9852876 A1     11/1998
WO     WO-2006017646 A1     2/2006

OTHER PUBLICATIONS

International Search Report for PCT/AU2013/000305, mailed May 22, 2013; ISA/AU.

*Primary Examiner* — Arun S Phasge
(74) *Attorney, Agent, or Firm* — Harness, Dickey & Pierce, P.L.C.

(57) ABSTRACT

A fluid conditioning control system for driving one or more coils in a fluid conditioning system with a target load current to generate an alternating magnetic field directed at a fluid, the control system comprising a controller, a switch mode power supply circuit and a push pull AC drive circuit, wherein the controller is arranged to develop a first variable output having a frequency range that sweeps between a minimum frequency and a maximum frequency, and further arranged to develop a second variable output in the form of a duty cycle controlled signal, wherein the switch mode power supply circuit is arranged to develop a variable supply voltage to the AC drive circuit in response to the second variable output and a current sense circuit, and the AC drive circuit is arranged to develop a drive signal for developing a target load current in response to the first variable output and the variable supply voltage, thereby forming a current feedback loop.

27 Claims, 9 Drawing Sheets

(51) Int. Cl.
*E21B 41/02* (2006.01)
*B01D 65/08* (2006.01)
*C02F 1/28* (2006.01)
*C02F 1/44* (2006.01)
*C02F 103/06* (2006.01)
*C02F 103/10* (2006.01)
*H02M 3/156* (2006.01)
*H02M 7/5387* (2007.01)
*H02M 1/00* (2006.01)
*C02F 101/10* (2006.01)

(52) U.S. Cl.
CPC .......... *B01D 2321/22* (2013.01); *C02F 1/281* (2013.01); *C02F 1/283* (2013.01); *C02F 1/441* (2013.01); *C02F 1/442* (2013.01); *C02F 1/447* (2013.01); *C02F 2101/10* (2013.01); *C02F 2103/06* (2013.01); *C02F 2103/10* (2013.01); *C02F 2201/46* (2013.01); *H02M 3/156* (2013.01); *H02M 7/5387* (2013.01); *H02M 2001/007* (2013.01); *Y02W 10/37* (2015.05)

(56) References Cited

U.S. PATENT DOCUMENTS

| | | |
|---|---|---|
| 6,198,198 B1 | 3/2001 | Fujimura |
| 2006/0196773 A1 | 9/2006 | Baosheng |
| 2007/0029261 A1 | 2/2007 | Chew |
| 2012/0067727 A1 | 3/2012 | Thompson |

* cited by examiner

FLUID CONDITIONING

CROSS REFERENCE TO RELATED APPLICATIONS

This application is a U.S. National Phase Application under 35 U.S.C. 371 of International Application No. PCT/AU2013/000305 filed on Mar. 26, 2013 and published as WO 2013/149287 A1 on Oct. 10, 2013. This application is based on and claims to from Australian Patent Application No. 2012901312 filed on Apr. 2, 2012. The entire disclosures of all of the above applications are incorporated herein by reference.

TECHNICAL FIELD

The present invention relates to improvements in fluid conditioning. In particular, the present invention relates to systems, methods and assemblies utilising an alternating drive signal to drive one or more coils to condition fluid.

BACKGROUND

In the fluid treatment industry, the formation of scale as a result of minerals precipitating on desalination membranes where reverse osmosis (RO) takes place is a potential problem that may affect the conversion or recovery of product or permeate water (for example) from the available water supply. For these RO systems, and indeed any other membrane based treatment systems, it may be considered desirable that minerals or salts within the water supply are reduced to a much lower concentration than for non membrane based treatment systems. Although nano-filtration, ultra-filtration or micro-filtration membranes reduce particles, organic matter and other contaminants larger than salt and dissolved minerals, the membranes are also subject to mineral scale formations thus reducing permeate or product water flow volumes.

It may be desirable to achieve conversion or recovery of the maximum amount of water as fresh product water at the minimum cost. It is however well recognised that water recovery for RO and productivity of permeate of nano, ultra & micro filtration membrane systems are limited by the precipitation of sparingly soluble solutes including silica, barium sulphate, magnesium, calcium carbonate and calcium sulphate, which can scale and ruin the membranes.

Conventionally, the control of scaling includes the use of: (i) salt regenerating water softeners for the reduction of positively charged scaling minerals such as calcium and magnesium—negatively charged silica and silicon are not removed by this standard cation exchange softener method and require dosing of antiscalant chemicals to protect membranes; (ii) Birm™ media filter which is a media for the reduction of dissolved iron and manganese compounds from raw water supplies or feed water, as well as for green sand filters; it acts as an insoluble catalyst to enhance the reaction between dissolved oxygen and the iron compounds; (iii) acid for the prevention of calcium carbonate scale; and (iv) antiscalant chemicals for keeping the solutes in a supersaturated state.

Although the use of the above chemical techniques are effective, they have the shortcoming in that it is maintenance time consuming and costly to maintain and operate membrane systems affected by mineral scale and requires the installation of cation and anion exchange filtration and ongoing dosing of antiscalant chemicals. For instance, it is difficult and costly to accurately predict the maximum concentrations of the sparingly soluble solutes in excess of recorded solubility limits that can be tolerated with antiscalant chemicals.

Further, in the case of cation exchange softeners, these only work in low salinity applications because higher salt content in the water reduces the positively charged bonding and/or attraction of calcium to the media Prior known systems have incorporated voltage based signal drive systems for driving signals into coils in an attempt to treat or condition fluid to avoid or remove scaling. However, these systems generally use and/or waste a large amount of power in generating the drive signals, which can lead to problems where the fluid treatment plants are remote from mains power supplies. Further, this problem may be exacerbated when the signals are being driven into low ohmic loads which then require increased power consumption. This can lead to a loss of fluid conditioning in systems that may have a limited power supply.

Further, prior known fluid treatment methods associated with bore holes require ground fluid (e.g. water) to be extracted from a bore hole using a submersible pump. After the water has been extracted, the water may then be treated or conditioned. However, the submersible pump itself may have scale formed therein, thus reducing the capacity of the water being pumped and reducing the working life of the pump itself.

An object of the present invention is to provide one or more improved systems and methods for the conditioning of fluids, or to at least provide the public with a useful choice.

The present invention aims to overcome, or at least alleviate, some or all of the afore-mentioned problems.

Further objects and advantages of the invention will be brought out in the following portions of the specification, wherein the detailed description is for the purpose of fully disclosing the preferred embodiment of the invention without placing limitations thereon.

The background discussion (including any potential prior art) is not to be taken as an admission of the common general knowledge in the art in any country. Any references discussed state the assertions of the author of those references and not the assertions of the applicant of this application. As such, the applicant reserves the right to challenge the accuracy and relevance of the references discussed.

SUMMARY

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components that the use directly references, but optionally also the inclusion of other non-specified components or elements. It will be understood that this intended meaning also similarly applies to the terms mentioned when used to define steps in a method or process.

It will be understood that, when describing various integers, such as modules, components, elements etc., any integer may be constituted by a single integer or multiple integers.

According to one aspect, the present invention provides a fluid conditioning control system for driving one or more coils in a fluid conditioning system with a target load current to generate an alternating magnetic field directed at a fluid, the control system comprising a controller, a switch mode power supply circuit and a push pull AC drive circuit, wherein the controller is arranged to develop a first variable output having a frequency range that sweeps between a minimum frequency and a maximum frequency, and further arranged to develop a second variable output in the form of a duty cycle controlled signal, wherein the switch mode power supply circuit is arranged to develop a variable supply voltage to the AC drive circuit in response to the second variable output and a current sense circuit, and the AC drive circuit is arranged to develop a drive signal for developing a target load current in response to the first variable output and the variable supply voltage, thereby forming a current feedback loop.

The AC drive circuit may be an H-bridge circuit.

The first variable output may be a square wave signal.

The second variable output may be a pulse width modulated signal.

The drive signal may be a square wave signal having a frequency range that sweeps between a minimum frequency and a maximum frequency.

The target load current may be a target RMS load current.

The current feedback loop may be arranged to monitor a switched current output of the switch mode power supply circuit, where the variable supply voltage is based on the switched current output.

The controller may be further arranged to determine whether the variable supply voltage developed for the AC drive circuit is at a maximum desired level and, upon a negative determination, may be arranged to adjust the second variable output to reduce an initially developed target load current to a lower value target load current based on a change in the variable supply voltage.

The controller may be further arranged to reduce the initially developed target load current by the same factor as the variable supply voltage has dropped from the maximum desired level.

The switch mode power supply circuit may be arranged to develop a variable supply voltage to the AC drive circuit to enable the AC drive circuit to develop the drive signal with the target load current to a load connected to the AC drive circuit when the load is approaching zero ohms.

The controller may be further arranged to adjust the developed variable supply voltage to the AC drive circuit based on the current feedback loop to counteract the variable reactance values generated in the one or more coils by virtue of the frequency range of the first variable output.

The system may be adapted to drive at least two coils in the fluid conditioning system, wherein each coil is separated by a predetermined distance.

According to a further aspect, the present invention provides a method of driving one or more coils in a fluid conditioning system with a target load current to generate an alternating magnetic field directed at a fluid, the method comprising the steps of: developing, in a controller, a first variable output having a frequency range that sweeps between a minimum frequency and a maximum frequency, and developing, in the controller, a second variable output in the form of a duty cycle controlled signal, developing, in a switch mode power supply circuit, a variable supply voltage for a push pull AC drive circuit in response to the second variable output and a sensed current, and developing, at the AC drive circuit, a drive signal to develop a target load current in response to the first variable output and the variable supply voltage thereby forming a current feedback loop.

The AC drive circuit may be an H-bridge circuit.

The first variable output may be a square wave signal.

The second variable output may be a pulse width modulated signal.

The drive signal may be a square wave signal having a frequency range that sweeps between a minimum frequency and a maximum frequency.

The target load current may be a target RMS load current.

The method may further include the step of the current feedback loop monitoring a switched current output of the switch mode power supply circuit, where the variable supply voltage is based on the switched current output.

The method may further include the step of the controller determining whether the variable supply voltage developed for the AC drive circuit is at a maximum desired level, and, upon a negative determination, adjusting the second variable output to reduce an initially developed constant load current to a lower value constant load current based on the drop in the variable supply voltage.

The method may further include the step of the controller reducing the initially developed target load current by the same factor as the variable supply voltage has dropped from the maximum desired level.

The method may further include the step of the switch mode power supply circuit developing the variable supply voltage to enable the AC drive circuit to develop the drive signal and apply it to a load connected to the AC drive circuit so the drive signal still maintains a target load current when the load impedance is approaching zero ohms.

The load impedance may be 100 milliohms or greater.

The method may further include the step of the controller adjusting the developed variable supply voltage to the AC drive circuit based on the sensed current to counteract the variable reactance values generated in the one or more coils by virtue of the frequency range of the first variable output.

The fluid conditioning system may be used in conjunction with a membrane based fluid treatment system.

The membrane based fluid treatment may be one of reverse osmosis, nano filtration, ultra filtration and micro filtration fluid treatment.

The method may be adapted to drive at least two coils in the fluid conditioning system, wherein each coil is separated by a predetermined distance.

According to yet a further aspect, the present invention provides a fluid conditioning system adapted to condition fluid in a bore hole, the system comprising at least one non metallic fluid pipe portion with one or more coils wrapped around the pipe portion, a drive system comprising a push pull AC drive circuit and a coil drive circuit, wherein the AC drive circuit is arranged to generate a drive signal having a target current and a frequency range that sweeps between a minimum frequency and a maximum frequency, wherein the drive system is arranged to transmit the drive signal from the coil drive circuit to induce the drive signal into the one or more coils for conditioning fluid that passes through the one or more coils.

The minimum frequency may be substantially 100 Hz.

The maximum frequency may be substantially 5 kHz.

The target current of the drive signal may be a target RMS load current.

The system may further comprise an electrically shielded cable containing electrical connections between the coil drive circuit and the one or more coils.

The fluid pipe portion may be adapted for attachment to a submersible pump.

The coils may be sealed with a seal.

The seal may be fibreglass.

The number of windings in the coil may be substantially 10 windings per centimeter.

The system may be adapted for use in conditioning fluid while the fluid is in a bore hole.

The system may be adapted for use in conditioning fluid prior to the fluid being pumped out of a bore hole.

The pipe portion may have at least two coils wrapped around it, wherein each coil is separated by a predetermined distance.

The AC drive circuit may comprise the above-described fluid conditioning control system.

According to yet a further aspect, the present invention provides a method of conditioning fluid in a bore hole, the method comprising: attaching at least one non metallic fluid pipe portion to a submersible pump, where the pipe portion has one or more coils wrapped around it, inserting the pipe portion and pump into the bore hole, generating a drive signal having a target current and a frequency range that sweeps between a minimum frequency and a maximum frequency, and transmitting the generated drive signal to the one or more coils for conditioning fluid that passes through the one or more coils within the bore hole.

The minimum frequency may be substantially 100 Hz

The maximum frequency may be substantially 5 kHz.

The fluid may be conditioned prior to it being pumped into the submersible pump.

The method may further comprise the method of driving one or more coils in a fluid conditioning system.

The pipe portion may have at least two coils wrapped around it, wherein each coil is separated by a predetermined distance.

According to yet a further aspect, the present invention provides a method of driving one or more coils in a fluid conditioning system with a target load current to generate an alternating magnetic field as a pre treatment of the fluid prior to membrane based fluid treatment, the method comprising the steps of: developing, in a controller, a high frequency pulse width modulated input signal for an a push pull AC drive circuit, wherein the input signal is modulated by a low frequency waveform that sweeps between a minimum frequency and a maximum frequency, developing a fixed voltage supply for the AC drive circuit, developing a load current output from the AC drive circuit based on the pulse width modulated signal and a current feedback signal, filtering the high frequency components of the output of the AC drive circuit to develop an output signal based on the low frequency waveform, applying the output signal to the one or more coils attached to a fluid conduit to pre-treat fluid for a membrane based fluid treatment system.

The AC drive circuit may be an H-bridge circuit.

The membrane based fluid treatment may be one of reverse osmosis, nano-filtration, ultra-filtration and micro-filtration fluid treatment.

The output signal may be applied to at least two coils with each coil separated by a predetermined distance According to yet a further aspect, the present invention provides an assembly for fluid treatment, the assembly including: at least one filtering membrane; and an apparatus for reducing the production of scale on the membrane; wherein the apparatus comprises a non-metallic element adapted in use to be connected directly or indirectly to the membrane; at least one coil being wound around the element and adapted in use to generate an electrodynamic field with a desired sweeping wave frequency.

According to yet a further aspect, the present invention provides in an assembly for fluid treatment including at least one filtering membrane, the use of an apparatus for reducing the production of scale on the membrane; wherein the apparatus includes a non-metallic element adapted in use to be connected directly or indirectly to the membrane; at least one coil wound around the element adapted in use to generate an electrodynamic field with a desired sweeping wave frequency.

According to yet a further aspect, the present invention provides a method for reducing the production of scale on a filtering membrane, the method including the steps of: directing a fluid flow through a non-metallic element having at least one coil wound there around; preferably generating an electrodynamic field with a desired sweeping wave frequency; and thereafter directing the fluid flow into and/or through the membrane.

BRIEF DESCRIPTION OF THE DRAWINGS

Embodiments of the present invention will now be described, by way of example only, with reference to the accompanying drawings, in which.

DESCRIPTION OF EMBODIMENTS

Figure 1A:
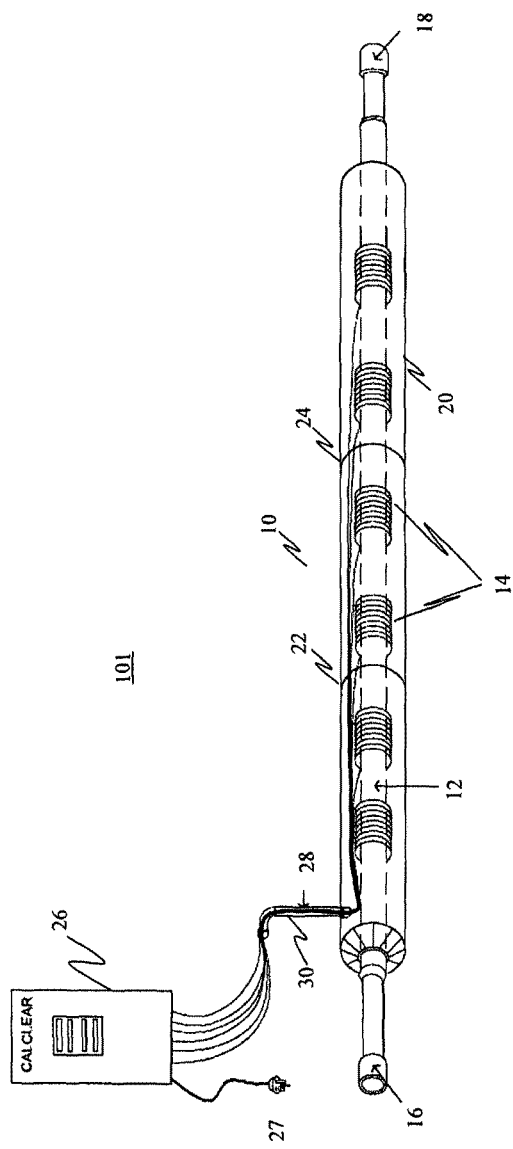
FIG. 1A shows a fluid conditioning system used in a reverse osmosis fluid treatment system according to an embodiment of the present invention.

According to the preferred embodiments described herein a new class of descaling systems, methods and apparatus are described that are highly effective across a broad range of industrial applications. In general, the herein described embodiments provide a powerful electrodynamic field across a swept frequency spectrum through a moving flow of fluid (such as water, for example) and do so whilst using the minimum amount of energy required to achieve the desired effect.

The various embodiments do this by generating and applying swept frequency alternating currents through one or more coils wrapped around one or more pipes carrying the water flow. It will be understood that, in practice, different applications will require varying coil sizes and varying lead lengths between the coils and the drive electronics. For example, some applications may have a wind powered pump and no readily available conventional power source. In such cases the flow rates will be relatively low, therefore the pipe diameters may be relatively narrow and the electronics may be sited close to the pipe. The coil impedance may be relatively low and therefore the overall power requirement may be low resulting in a cost effective solar power option.

Other applications may require the electronics to be remote from the coils, such as at a bore head, where the coils reside underground near the bore pump and the electronics reside at ground level. In such cases, conventional power is typically available and the overriding requirement is to maintain the field strength at an optimum value, whereas power conservation may not be a major consideration. The fact that the herein described embodiments may be power efficient in this situation will impact considerably on their reliability, since their losses and therefore running temperature are considerably lowered and reliability of electronics is strongly correlated to operating temperature.

Other applications may have the control systems and associated electronics situated close to the one or more coils, but the one or more coils themselves may be on larger diameter pipes up to 200 mm or more in diameter. For example, this may typically be the case in large desalination plants or other membrane based filtration systems. In this case, the one or more coils themselves may have much higher impedance and similar considerations may apply as above.

Effectively, the larger the pipe diameter and the further the distance the output signal transmission lines need to travel, the greater the power output should be from the controller to counteract the greater impedance and signal losses.

No site customization is required to operate optimally in all of the above situations. The various embodiments are adapted to a range of load impedances with a range in excess of 100:1. Typically these could be from 100 milliohms to 10 ohms whilst still delivering a current of 2 amps (for example), which covers all of the above described situations. It has been determined through trials that the 2 A current provides a powerful field, and since currents less than 200 mA have also been demonstrated to be effective this provides a considerable margin to guarantee effectiveness in the application. The current may also be controlled as required by connecting the unit via a serial port to a PC and reset by the user.

The various embodiments achieve their universality by using a processor controlled current source to maintain the field current at a predetermined set point irrespective of the load. Energy efficiency may be achieved whilst doing this by the use of Class D amplifier or switch mode power supply techniques.

Various embodiments of the present invention will now be described in detail.

First Embodiment

Referring to FIG. 1A, a fluid conditioning system 101 includes an apparatus 10 for preventing or substantially reducing the likelihood of scaling on a surface in a hydraulic environment. The apparatus 10 includes a non-metallic element in the form of a plastic pipe section 12 which is configured such that it may be retrofitted or incorporable into a piping system. According to this embodiment, the diameter of the pipe is 100 mm and the length is 3 m.

The apparatus 10 has six coils 14 wound around a plastic pipe section 12 which has an inlet 16 (adapter connector for connecting to inlet pipes) at one end and an outlet 18 (adapter connector for connecting to outlet pipes) at an opposing end. The plastic pipe is encapsulated by a shell 20 and is held in place by spacers 22 and 24 in the form of donut-shaped O-rings. Each of the coils 14 is connected to a control system 26 which includes a microcontroller and is in turn connected to a power supply via a power cable 27. A portion 28 of the electrical wires connecting the coils 14 to the control system 26 is covered and protected by a sleeve 30.

In operation, the microcontroller of the control system 26 cooperates with a switching amplifier to form a closed loop for generation of electrodynamic waves of a predetermined strength with a desired sweeping wave frequency via the coils 14. The closed loop functions as a current amplifier which generates a flow of current through the coils 14 to create the electrodynamic field. The operation of the apparatus 10 and the electronic control system are described in the specifications of Australian patent application No. 2011201383 published as AU2011201383A1 and corresponding U.S. patent application Ser. No. 13/072,105 published as US2012/0067727, both of which are hereby incorporated by reference.

Figure 1B:
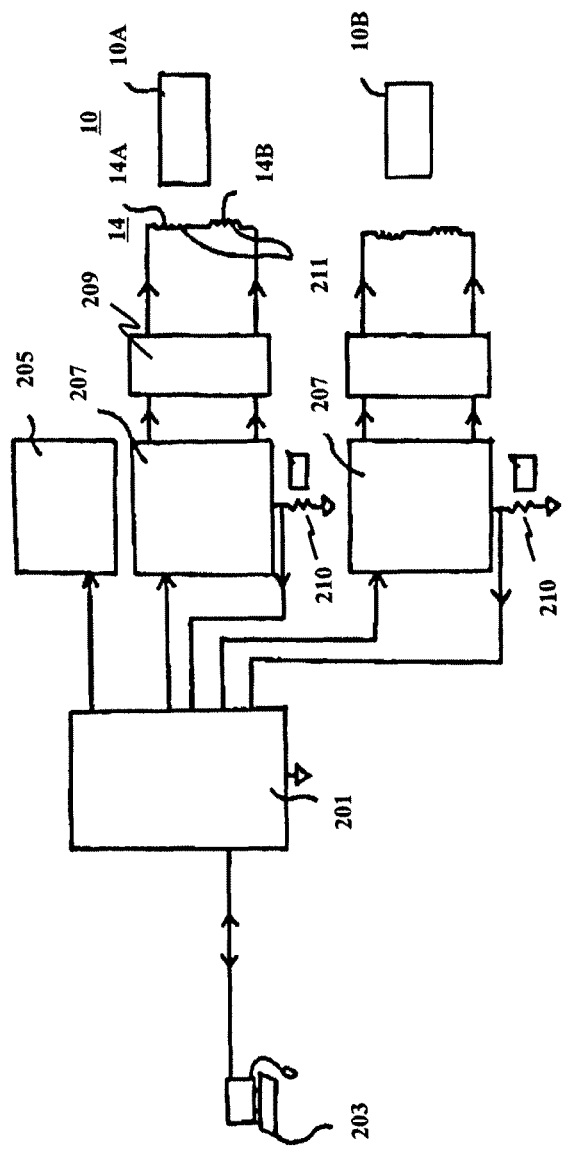
FIG. 1B shows a block diagram of a control system used in a reverse osmosis fluid treatment system according to an embodiment of the present invention.

FIG. 1B shows the control system 26 with a microcontroller 201 that cooperates with a switching amplifier to form a closed loop for generation of a magnetic field of a predetermined strength via the coils 14. The closed loop functions as a current amplifier that generates a flow of current through the coils to create the magnetic field.

The microcontroller 201 is programmed to generate a digital signal at a high frequency to the switching amplifier. The digital signal is a pulse width modulation (PWM) signal. The microcontroller 201 has a processing unit such as a CPU, a non-volatile storage device (such as FLASH) for program and variables, and a storage device (such as SRAM) for storage of dynamic data during operation. The microcontroller 201 also has a counter for digital signal generation and an analogue to digital converter for measurement of the load current. Furthermore, the microcontroller includes a UART adapted to serially communicate with an external device such as a computer 203. The microcontroller 201 is also connected to a LED 205 that is activated by the digital signal generated by the microcontroller 201. The LED 205 indicates an operational status and conditions of the apparatus. The switching amplifier is a class D amplifier including a bi-directional push-pull digital drive circuit driven by the PWM digital signal generated by the microcontroller. The digital drive circuit 207 is an H-bridge having a ground or power leg with a sense resistor 210. The sense resistor is a low value resistor capable of detecting amplitude of the current flowing through the coils. As shown in FIG. 1B, there may be more than one control system for driving two independent apparatus 10A and 10B.

The microcontroller 201 creates an output signal in the form of an analogue signal. The analogue signal is a sinusoid or square wave that is monitored by the microcontroller 201 in the closed loop via the sense resistor. The microcontroller 201 is programmed to adjust the analogue signal according to the detected current amplitude to generate a desired current that corresponds to the predetermined magnetic field strength.

It should be appreciated that the frequency of the analogue signal may be continually adjusted by the microcontroller 201 so as to achieve a frequency sweep between substantially 100 Hz to 5 KHz.

The closed loop also has a filtering module 209 connected between the H-bridge 207 and the load coils 14. The output signal from the H-bridge 207 has high voltage digital signals coherent with the PWM digital signal generated by the microcontroller 201. The filtering module 209 functions to remove one or more high frequency components (such as a high frequency EMI component) from the output signal thereby leaving a baseband audio component as required by the apparatus.

In operation, one of two coils (14A) establishes a magnetic field of one polarity whilst the other coil (14B) establishes a field of an opposite polarity. It is contemplated that a plurality of coils may be used to establish or enhance a desired magnetic field when the liquid is flowing at a high velocity, for example, when the metallic pipe is a narrow gauge pipe.

The microcontroller 201 generates a swept frequency signal that in turn drives the Class D audio frequency amplifier. Establishment of the alternating magnetic field is then accomplished by driving the Class D audio frequency amplifier into the coils 14 wound around the pipe section where the wastewater under treatment is to be passed. Each coil includes windings 211 that are reversible to achieve reversal of the magnetic field. Phase reversal of the field is achieved by changing the direction of the windings 211.

The microcontroller 201 of the apparatus may be connected to a computer 203 via a serial port and a software interface provided via terminal emulation (such as Hyper-terminal on the computer). As such, the operating parameters including the desired current can easily be set via the software interface and a serial communications link to the microcontroller that will retain the parameters in a non-volatile storage such as EEROM. Also, the operating parameters, the operating status and alarm conditions are displayed to a user on the LED 205.

Figure 2:
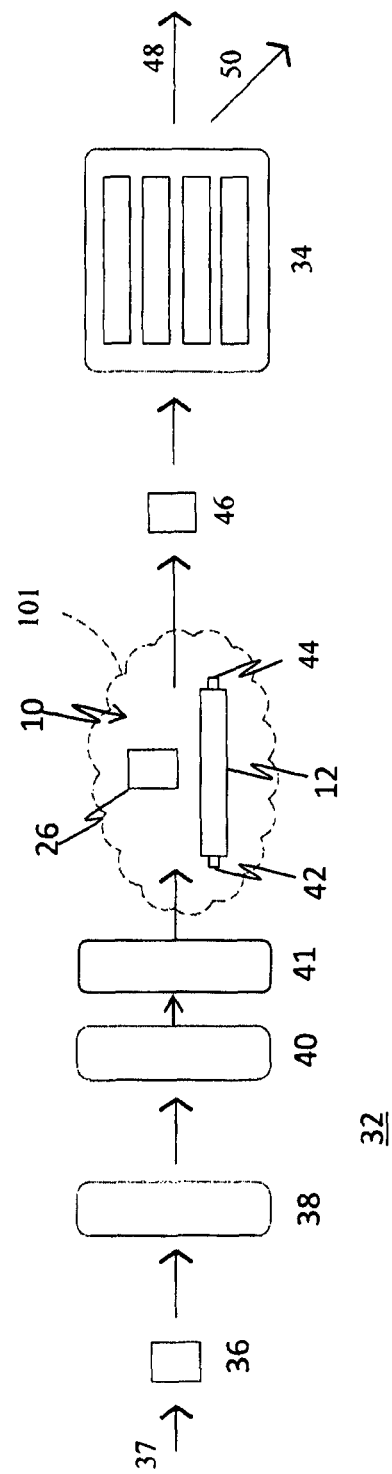
FIG. 2 shows a fluid conditioning system used in a reverse osmosis fluid treatment system according to an embodiment of the present invention.

Turning to FIG. 2, an assembly 32 for fluid treatment has a plurality (or bank) of membranes 34 which are interconnected and arranged such that they form a sheet of membranes. The membranes 34 are designed to facilitate reverse osmosis in the present embodiment. It will be appreciated that the apparatus 10 may be used to prevent or reduce scaling on membranes adapted to facilitate nanofiltration, ultra-filtration or micro-filtration. The assembly 32 has a filter pump 36 which functions to pump the product or permeate water from an inlet water supply 37, which may be heavily mineralised, into and through a media filter 38. According to this embodiment, the feed water may then flow through an activated carbon filter 40 and through a particle and/or sediment filter 41. The activated carbon filter 40 is operatively connected to one end 42 of the non-metallic element 12 so as to allow the feed water to flow through the element 12 via the inlet 16 (see FIG. 1A). It will be understood that the activated carbon filter is optional and that fluid treatment embodiments are envisaged without the use of such a filter. Activated carbon filters may be used if the water has chlorine content known to be damaging to the RO membrane. If there is no chlorine content, the activated carbon filter may be bypassed or omitted completely.

An opposing end 44 of the non-metallic element 12 is operatively connected to a pressure pump 46 which is connected to the membranes 34. The pressure pump 46 causes reverse osmosis to take place when pumping the pre-treated feed water into and through the membranes 34. The feed water is then divided into RO permeate product water 48 which is generally referred to as recovered or converted water and concentrated rejected water 50 which is discarded.

It will be appreciated that the apparatus 10 of the present invention may also be used to prevent or at least substantially reduce the likelihood of scaling on the membrane. The apparatus 10 may remove scale that has previously accumulated on the surface of the membrane if required. This will progressively descale over time, as the electromagnetic waves of swept (at the desired) frequency impacts on various minerals which typically cause scale.

In operation, the feed water is pre-treated before reverse osmosis takes place at the membranes 34. Pre-treatment is important when working with RO and nanofiltration (NF) membranes 34 due to the nature of their typical spiral wound design. It will be understood that nanofiltration membranes may be used more frequently up front of reverse osmosis membranes to reduce calcium and other minerals in order to protect the reverse osmosis membranes. Further, additional pre-treatment may be required to reduce the impact of scaling of the nanofiltration membranes. The material used to form the membranes 34 is engineered in such a fashion as to allow only one-way flow through the membranes 34. As such, the spiral wound design does not allow for backpulsing with water or air agitation to scour their surfaces and remove solids. Pre-treatment is therefore a necessity for the RO mechanism. Pre-treatment involves the feed water flowing through the filter pump 36, media filter 38, activated carbon filter 40 and the apparatus 10. When the water flow is directed through the non-metallic element 12 of the apparatus 10, the coils 14 are driven with a load current resulting in the creation of a magnetic field. This has the effect of preventing or at least substantially reducing the likelihood of scaling when the water flow is subsequently directed into and/or through the membrane.

It will be understood that the filtering membrane may be a membrane adapted to facilitate reverse osmosis, nano-filtration, ultra-filtration or micro-filtration.

It will also be understood that the wave frequency may be capable of preventing one or more minerals from forming scale. More preferably, the wave frequency may be generated by a control means such as a computer.

Further, it will be understood that the apparatus may be capable of removing scale from membranes in any suitable membrane based treatment system.

Also, it will be understood that the term fluid is intended to mean any suitable fluid that can be treated in a fluid treatment system, and may be low mineral concentration ranging to brackish, saline or any water which is light to heavily mineralised.

The assembly is preferred to include a first pump adapted to pump the brackish water through a first filter. Preferably, in the case of membranes contained in a pressure vessel such as reverse osmosis or nano, ultra or micro filtration membranes the first filter is a media filter. Submerged microfiltration or ultrafiltration membranes may or may not require an upstream media filter Now that a preferred embodiment of the present invention has been described in some detail, it will be apparent to a person skilled in the art that the assembly, apparatus and method of the present invention may offer at least the following advantages: i) they reduce scaling on the filtration membranes in RO desalination, nano-filtration, ultra-filtration or micro-filtration systems thereby converting or recovering product or permeate water by reducing salt or minerals with RO and other contaminants of particle or molecular sizes reduced by nano, ultra and micro filtration from all water sources; ii) they increase the water flow rate through the membranes due to prevention or removal of scale on the membranes; iii) they increase the productivity of recovered water from high to low levels of mineralised feedwater; iv) they decrease the volumes of concentrated waste with RO; v) they reduce or eliminate use of chemical antiscalants; vi) they save energy as less energy is required to pump the feed water which has no Birm™ or cation or anion exchange mineral removal softener media filters; vii) they are low maintenance; and viii) they reduce capital and operational expenditure.

According to this embodiment, it will be understood that the apparatus 10 and control system 26 may be used with any suitable membrane based filtering system. The apparatus and control system may be retrofitted into an existing membrane based filtering system. Alternatively, the apparatus and control system may function as a separate system feeding the conditioned fluid output from the apparatus into the membrane based filtering system. As a further alternative, the apparatus and control system may be fully incorporated within a membrane based filtering system during production to form a complete membrane based filtering system with an integrated fluid conditioning system as described herein.

Second Embodiment

This second embodiment utilises the apparatus 10 as shown in the fluid conditioning system 101 as described in the first embodiment. However, according to this second embodiment, the control system 26 is replaced by a different control system 301.

Figure 3:
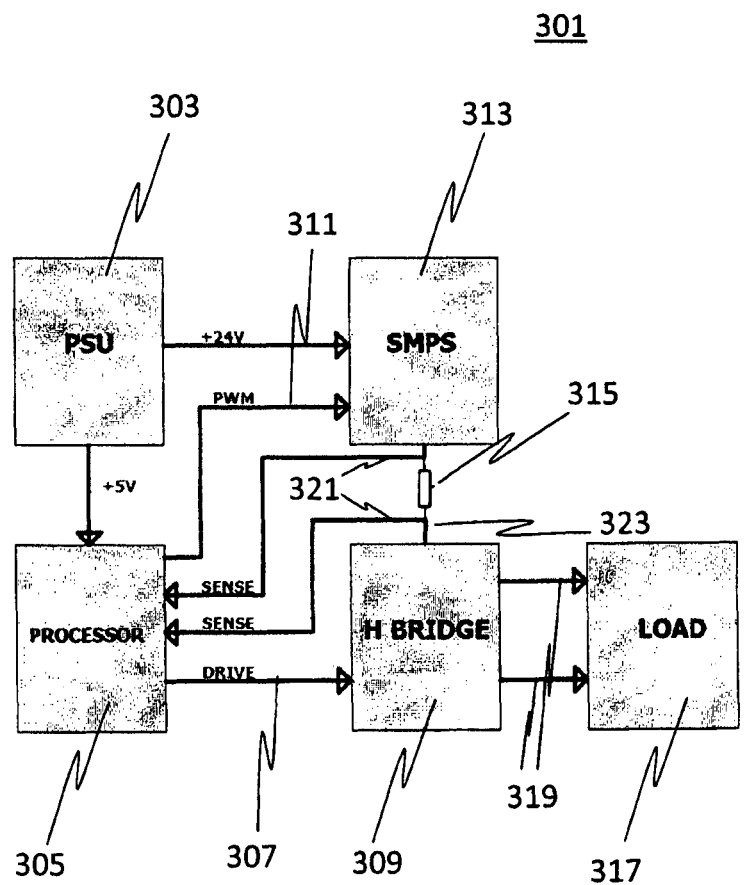
FIG. 3 shows a block diagram of a control system for a fluid conditioning system according to an embodiment of the present invention.

FIG. 3 shows a block diagram of the control system 301 for controlling apparatus 10 for conditioning fluid.

A power supply unit 303 provides a 5 V power source to a controller 305 in the form of a microprocessor. The controller 305 generates a first variable output in the form of a low-frequency drive signal 307 to a push pull AC drive circuit, which according to this embodiment is in the form of an H-bridge circuit 309. It will be understood that the AC drive circuit may be implemented using any other arrangements besides an H-bridge circuit.

The controller also generates a second variable output in the form of a duty cycle controlled signal 311, or pulse width modulated signal, which is fed to a switch mode power supply circuit 313. The switch mode power supply circuit 313 receives a 24 V power source from the power supply unit 303.

By varying the duty cycle of the second variable output from the controller, the voltage generated by the switch mode power supply may be modified. A current sensor 315, which according to this embodiment is in the form of a sense resistor, monitors the output of the switch mode power supply. This forms part of a current feedback loop, which provides current feedback information to the controller via sense lines 321.

The output 323 of the switch mode power supply feeds the voltage supply of the H-bridge circuit 309. Further, the H-bridge circuit receives the first variable output signal generated by the controller 305 which is used to drive the H-bridge circuit.

The first variable output signal generated is a frequency variable square wave signal varying in frequency from approximately 100 Hz up to approximately 5 kHz. That is, the first variable output signal sweeps between the minimum and maximum frequency, or sweeps across a frequency range.

It will be understood that the minimum frequency and/or maximum frequency may vary according to the requirements of the installation.

Although this second embodiment is optimised for the delivery of a square wave signal, it will be understood that alternative signal forms may be used, such as sine waves, triangular waves etc. However, it will be understood that using these alternative signals may provide a less efficient solution.

The H-bridge circuit is used to directly drive a load 317 with the low frequency signal 319 without requiring a high frequency filter to remove a high frequency PWM component as required in the first embodiment. The drive level is asserted by changing the supply voltage to the H-bridge circuit via the switch mode power supply through adjustment of the duty cycle of the second variable output generated by the controller. This arrangement therefore maintains the overall power efficiency of the system. As such, the overall power losses in this system may be lower and the implementation more economical than prior known systems.

Figure 4A:
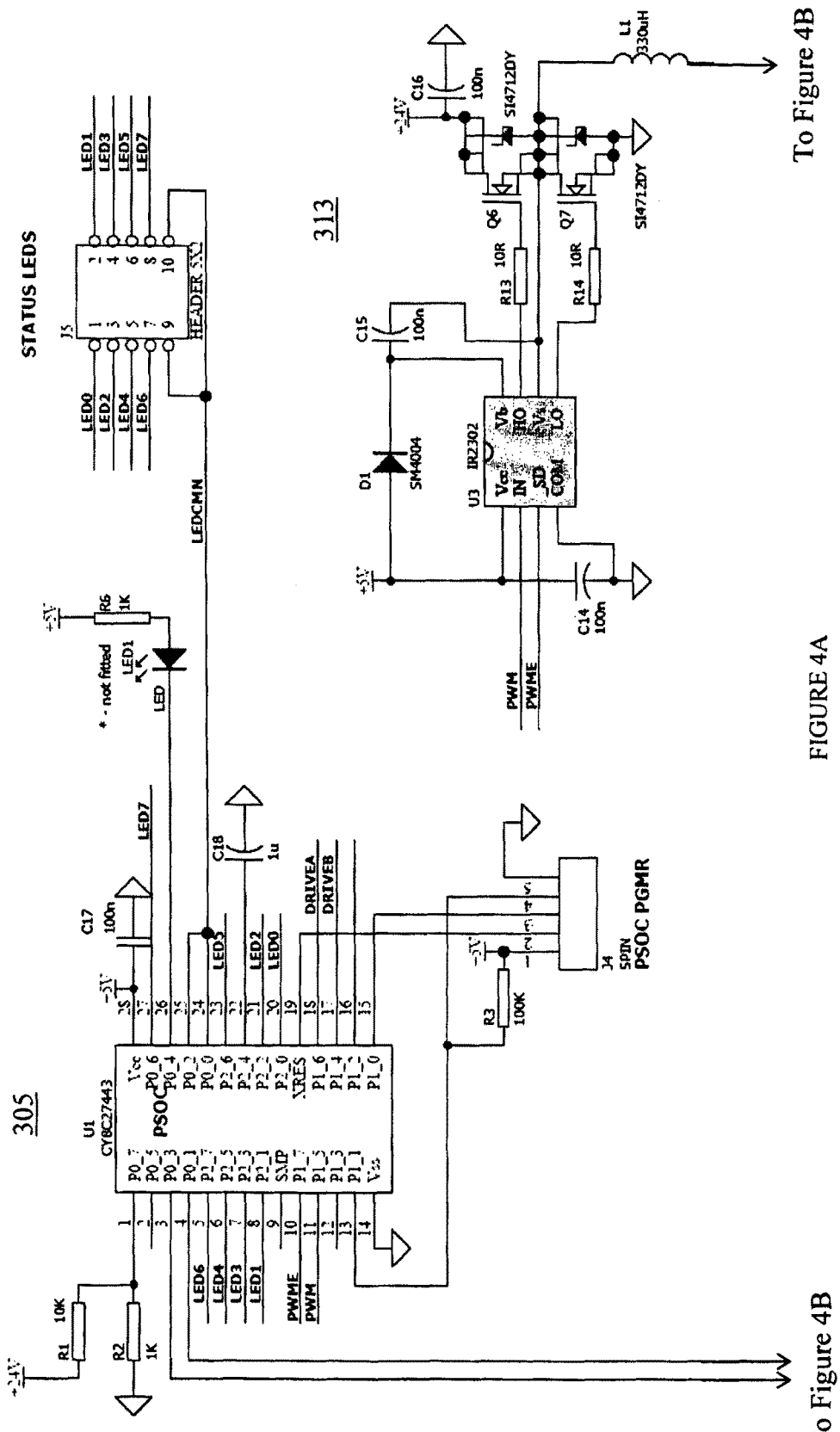
FIGS. 4A to 4C show a circuit diagram for a fluid conditioning system according to an embodiment of the present invention.
Figure 4B:
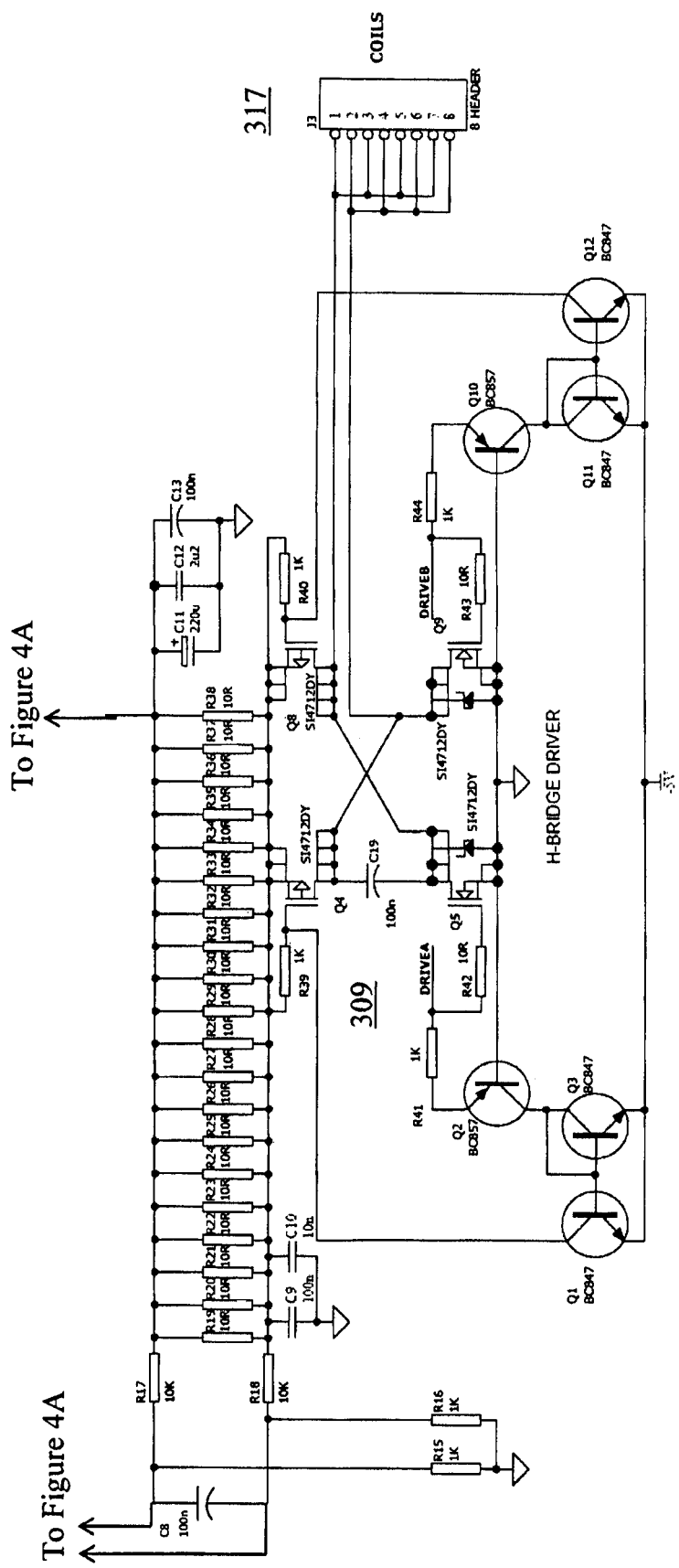
Figure 4C:
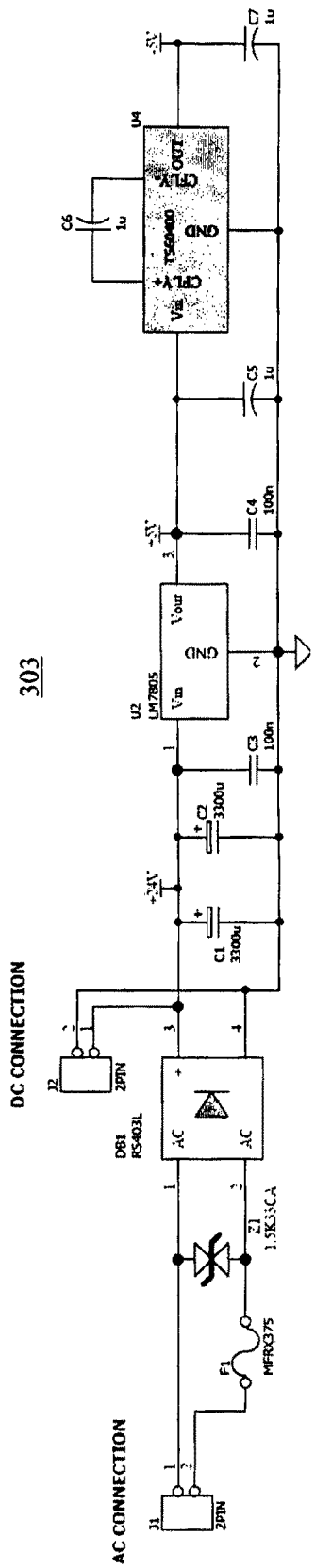

FIG. 4 shows a circuit diagram implementing the various elements of the system described above according to this second embodiment.

The power supply 303 includes an AC input through J1 and fuse F1 (to prevent any short circuits from damaging the supply transformer), overvoltage mediation by a transient voltage suppression diode Z1, the AC convert is rectified by diode bridge DB1 and filtered by electrolytic capacitors C1 & C2. Alternatively, DC may be input directly at J2. It will be understood that overvoltage and short circuit protection may be provided on the DC supply. 18 volts AC will yield approximately 24 volts DC as required for the unit. Alternatively a 24 volt DC input may be used. 5V as required by the processor is supplied by linear voltage regulator U2. C3 & C4 are used to stabilise the voltage regulator. U4 is a voltage inverter chip used to generate a −5 volt supply for driving the H Bridge driver. It has attendant capacitors C5-C7 to store and transfer charge in the voltage inversion process.

The processor U1 is a Cypress PsoC (programmable system on chip). This chip includes all required memory and peripherals as required for the system. PWM is generated directly by timer/counters on chip and controlled by software updating. In this case there are two distinct PWM controls in the circuit. The first signal drives the H drive circuit directly. The second controls the level of the voltage supplying the H drive circuit via the switch mode power supply. Resistors R1, R2 attenuate the supply voltage to a level that may be read by the PsoC ADC and which is used to implement a set point current derating schema as described below. Off board LEDs are also driven for status display purposes. J4 provides a programming port into the processor and also doubles as a serial connection port (5V level).

H Bridge Voltage Supply switch mode PWM signals from the processor are passed to U3 half bridge driver chip which drives two high current MOSFETs (Metal Oxide Semiconductor Field Effect Transistors) Q6 & Q7 in complement to supply a high voltage drive signal to inductor L1 which feeds switched current to filter capacitors C11-C13. By changing the duty cycle of the PWM the processor can thereby change the supply voltage across C11-C13.

Resistors R19-R38 implement a low cost, high power low ohmic resistance used to measure the supply current, this time on the high side of the H-bridge circuit. Measurement at this point ensures shorts to ground may be detected. Voltages across these resistors is fed via attenuator resistors R17, R15 and R18, R16 and filter capacitor C8 back to the processor U1 for measurement. This is the primary current loop feedback measurement. This switch mode supply can easily supply in excess of 4 A to the H Bridge signal drive.

The H-bridge signal drive provides a direct push pull AC drive to the load and the supply voltage to it can be regulated between 0 to +24V via the above switch mode voltage supply. By regulation of this supply, the current to the load is also controlled. The H-bridge is created by discrete MOSFETs Q4, Q8, Q5 and Q9.

Q4 & Q8 are P channel MOSFETs and are therefore gated by a more negative voltage. Q5 & Q9 are N channel MOSFETs gated by a more positive voltage. A 5V level drive signal is applied directly at DRIVEA or DRIVEB. Signals applied here are also applied to current mirrors Q1-Q3 and Q10-Q12 which translates as a −5V signal being applied to the gates of complementary P channel MOSFETs relative to their source voltage. U4 is a voltage inverter used to generate a −5V rail to supply the P channel MOSFET gates when their source voltage is near zero volts. This simple H Bridge drive may supply full current with a supply approaching zero volts, which may be critical to achieving efficiency with low impedance loads. Filter capacitor C19 helps reduce some EMI from the drive transitions. The drive signal for the coils is supplied via connector J3 allowing multiple parallel connections.

It will be understood that other suitable devices other than MOSFETs may be used as an alternative, such as a BJT (Bipolar Junction Transistor), IGBT (Insulated Gate Bipolar Transistor), JFET (Junction Gate Field Effect Transistor), SCR (Silicon Controlled Rectifier) and GTO (Gate Turn-off Thyristor) device.

Figure 6:
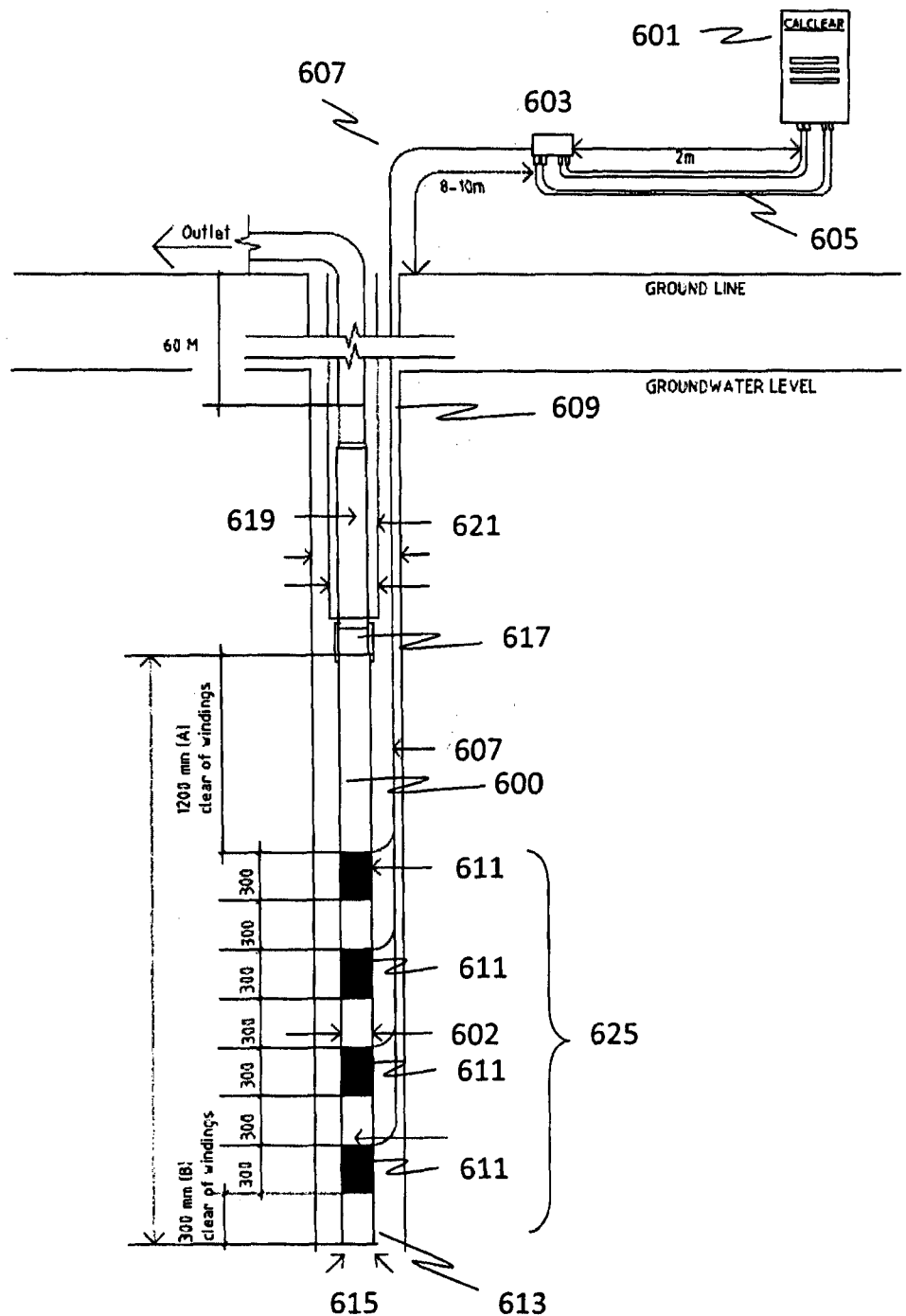
FIG. 6 shows a system for conditioning fluid in a bore hole according to an embodiment of the present invention.

Referring to FIG. 6, a flowchart is provided to describe how the processor controls the target RMS load current.

Figure 5:
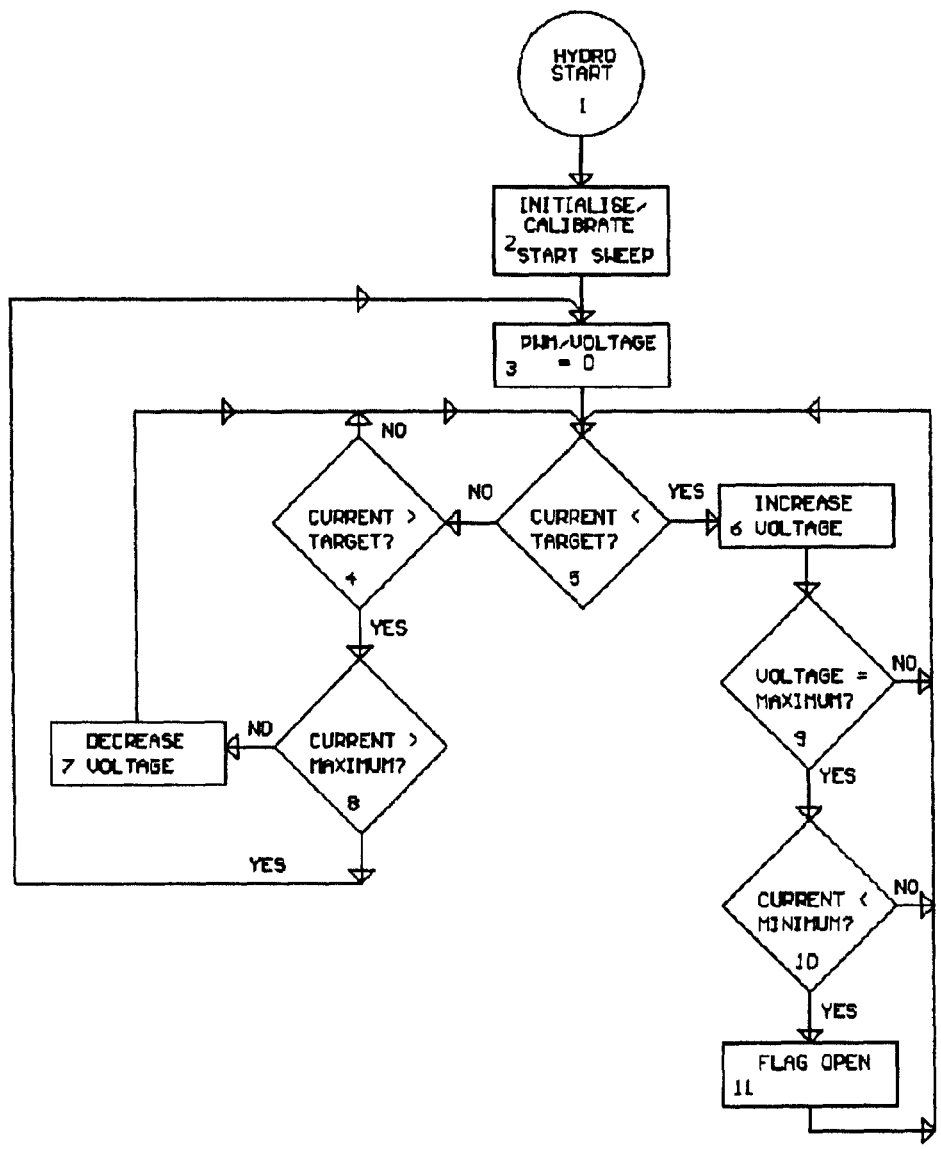
FIG. 5 shows a process flow diagram of a control system according to an embodiment of the present invention.

The following description is based on the process steps shown in FIG. 5.

At step 1, the system is first switched on.

At step 2, the hardware is initialised and calibration routines are performed whilst the unit is open circuit (i.e. not connected to the coil load) to calibrate current measurements across the sense resistor. The frequency sweep is also initialised after calibration.

At step 3, the drive voltage amplitude is initially set to zero as this is considered a safe starting point. This operates as the start point for a search by the control system for matching the measured load current to a target load current.

It will be understood that all current measurements referred to below are peak currents (i.e., this implies peak sample points, particularly on a sine wave).

At step 5, it is determined whether the measured load current is less than the target set point current. The target set point current may be a value that has been adjusted or derated based on the supply voltage as described herein.

At step 6, if it has been determined that the measured load current is below the target set point current then the control system increases the drive voltage by one increment. For example, the drive voltage may be increased in increments of 0.1 volts or any other suitable increment.

At step 9, if the control system has determined that the drive voltage has not reached its maximum value, i.e. it has not peaked, the process returns to the feedback loop as described in step 5 above.

At step 10, if the control system has determined that the drive voltage has peaked, the control system then determines whether the minimum required current has been obtained by comparing the measured load current with the desired minimum required current. The minimum required current may be an arbitrary number. For example, it may be 100% of the target current or a percentage thereof. If the control system determines that the minimum required current has been obtained, the process returns to the feedback loop as described in step 5 above.

At step 11, if the control system has determined that the minimum current has not been reached, this determination may be flagged to enable this information to be displayed on a user display in communication with the control system. An audible and/or visual warning may also be generated by the control system for display on a user display. For example, the determination that a minimum current is not being achieved may indicate that there may be an open circuit within the coil circuit or interconnecting wiring.

At step 4, the control system determines whether the current generated is greater than the target current by comparing the generated current with the target current. If the control system determines that the current generated is not greater than the target current, then this should indicate that the generated current equals the target current, as the generated current is neither greater than nor less than the target current. Therefore the process returns to the feedback loop of step 5 above. This indicates that stasis has been achieved.

At step 4, if the control system determines that the current generated is greater than the target current, the process moves to step 8.

At step 8, the control system determines whether a fault condition has developed on the load due to an excessive load current. For example, a sudden short across the load may cause excessive load current. If it has been determined that an excess current has been detected, the process returns to step 3 and resets the drive voltage to zero to prevent elongated periods of excessive current. The control system may generate a signal to indicate a fault and provide an audible and/or visible alarm on the user display.

At step 8, if the control system determines that the current is not excessive, the process moves to step 7.

At step 7, the drive voltage is reduced in incremental steps with an aim to reduce the load current. As in step 6, the drive voltage may be reduced in increments of 0.1 volts or any other suitable increment. Following this step, the process returns to the feedback loop of step 5.

Third Embodiment

Referring to FIG. 6, a fluid conditioning system for conditioning fluid within a bore hole is shown.

It will be understood that the control system 601 may comprise the control system of either of the first or second embodiments.

The output of the control system 601 is fed to an antenna (or coil) drive unit 603 via output cables 605. The output cables may be shielded and/or screened to reduce losses and interference.

Attached to the antenna drive unit 603 are wires that are in electrical communication with the one or more coils wrapped around the pipe section as described below. At least a first portion of the connecting wires 607 extending from the antenna drive unit is enclosed within a shielded cable to reduce the effects of interference coming from the submersible pump. The shielded cable extends from the antenna drive unit down into a bore hole 609 containing fluid that is to be conditioned.

A pipe section similar to that described above with reference to the first and second embodiments is located within the bore hole. However, the pipe section 600 according to this embodiment has an inside diameter of 205 mm and a maximum outside diameter (602) of 245 mm. The pipe section has one or more coils 611 wound around it, which are located toward a distal end 613 such that they are located towards a water intake portion 615 of the pipe section. Each coil is connected to the cable coming from the antenna drive unit 603. The opposing end 617 of the pipe section is adapted for fitting to a submersible pump 619.

According to this embodiment as shown in FIG. 6, four separate coils 611 are positioned along the pipe section. That is, four sets of coils are wound around the pipe, each coil covering a 300 mm portion along the length of the pipe section. A first pair of coils is located towards the distal end of the pipe section and each subsequent set of 300 mm wide coils is separated by a longitudinal gap of 300 mm. The coils may be covered with a fibreglass material to protect the coils from the fluid and walls of the bore hole, for example to avoid damage from impact According to this embodiment, the coils 611 have a concentrated number of windings. For example, each coil section may have up to 10 windings per centimeter providing 300 windings per 300 mm length of pipe section. The four sets of windings may then be separated by a longitudinal gap of 300 mm.

The submersible pump 619 may be encased within a further section of tubing (215 mm Inside Diameter PVC) located within a 300 mm ID (Inside Diameter) casing 621 that is within the bore hole 609.

It will be understood that the pipe section may be attached to the submersible pump using any suitable means, such as a bracket, brace, clamp or flange mechanism, for example.

It will also be understood that the pipe section may be fitted to the submersible pump prior to inserting the pump and the attached pipe section into the bore hole. The pump and pipe section may be inserted so that the pump (and therefore the pipe section) is below the groundwater level and preferably positioned towards the lower end of the bore hole.

Upon the control system generating the drive signals as described herein, the drive signals are communicated to the antenna drive box. The antenna drive box then transmits the drive signals via the shielded cable 607 to the one or more coils.

The drive signals are transmitted via the shielded cable to the coils. The operation of the system is effectively the same as described with reference to either of the first or second embodiments.

When the submersible pump is operated, water is taken into the pipe section at the intake. The water flowing inside the pipe section is conditioned in an area of treatment 625 due to the electromagnetic field generated by the coils positioned around the pipe. Therefore, the water flowing through the one or more coils is conditioned within the bore hole prior to the water being taken in by the submersible pump. The conditioned water is then pumped by the submersible pump back up to ground level to an outlet manifold.

It will be understood that alternative coil lengths and separation distances between coils may be used depending on the installation requirements. For example, the length of the pipe section upon which each coil is wound, or the separation distance between each coil, may be less than 300 mm, for example, 200 mm, 100 mm or less. Alternatively, the length of the pipe section upon which each coil is wound, or the separation distance between each coil, may be more than 300 mm, for example, 400 mm, 500 mm or more.

It will also be understood that the separation distance is not required to be substantially the same as the length of the section of pipe upon which each of the coils are wound.

The herein described embodiments transmit alternating electromagnetic wave frequencies through phase reversing signals that are transmitted through one or more coils wound around a pipe to generate resonant electro-dynamic fields through fluid that is passing through one or more pipe sections.

These embodiments therefore prevent scale formation and may remove scale on filtering membranes when used in various different filtering systems where Reverse Osmosis, nano filtration, ultra filtration or micro filtration takes place. The swept frequency signal is generated by a microcontroller. Electric current is used to generate a drive signal that reaches the various resonance frequencies required to affect all minerals that scale, thus preventing the minerals from bonding as crystals into hard adhesive scale.

The prevention and removal of adhesive scale means membrane treatment systems no longer require chemical dosing and chemical cleaning to maintain and achieve lower operational costs in terms of energy, labour, time and chemical consumables.

Further Embodiments

It will be understood that the embodiments of the present invention described herein are by way of example only, and that various changes and modifications may be made without departing from the scope of invention.

It will be understood that the various system elements, such as circuits, power supplies and amplifiers described herein, may be implemented using any suitable technology. For example, the system elements may be implemented using integrated circuits, discrete electronic components, digital signal processors, any combination thereof, or indeed any other suitable alternative.

Further it will be understood that certain system elements may be combined into a single system element or the functions of the herein described system elements may be separated out into multiple separate system elements.

Further, it will be understood that the various system elements described may be controlled with instructions implemented using any suitable form of technology. For example, the system elements may be controlled using any suitable software code written in any suitable language, where the code is then compiled to produce an executable program that may be run on any suitable computing system. Alternatively, or in conjunction with the executable program, the system elements may be implemented using any suitable mixture of hardware, firmware and software. For example, the system elements may be implemented using an application specific integrated circuit (ASIC), a system-on-a-chip (SoC), field programmable gate arrays (FPGA) or any other suitable adaptable or programmable processing device.

It will be understood that various embodiments of the conditioning systems and methods as described herein may be specifically adapted for use in membrane based water treatment filtration methods and applications to reduce the scale in those specific applications.

It will be understood that various embodiments described herein may be utilised by operators of membrane water & water recycling systems including sea water, brackish desalination, wastewater treatment, thermal desalination by both fossil fuel powered or solar means. As well as potable water treatment & industrial water treatment with membranes, and industrial water and wastewater treatment systems with source water capable of scale forming on surfaces and affecting performance potential. Further, the system may be used in sea water reverse osmosis (SWRO), solar thermal power generation and desalination, fossil fuel power generation and desalination, as well as on submersible bore pumps to prevent scaling on submersible pumps.

Further, it will be understood that the apparatus 10 as shown in FIG. 1A may be modified to fit any suitable fluid treatment system and as such the pipe portion may have any suitable diameter, circumference, length etc. Further, it will be understood that the adaptor portions of the pipe portion may be modified to fit any other suitable fluid inlet or outlet.

It will be understood that the fluid conditioning system of the second embodiment may also be retrofitted to a membrane based fluid treatment system. Alternatively, the fluid conditioning system of the second embodiment may function as a separate system feeding the conditioned fluid output from the fluid conditioning system into the membrane based filtering system. As a further alternative, the fluid conditioning system of the second embodiment may be fully incorporated within a membrane based filtering system during production to form a complete membrane based filtering system with an integrated fluid conditioning system as described herein with reference to the second embodiment.

Further, it will be understood that the coils may be formed from any suitable wire material. For example, the coils may be formed from motor rewind wire used in motor coils. That is, the coil wire does not have silicon covering to enable the wires to be wound more compactly.

Further, it will be understood that the pipe section of the various embodiments described above may include one or more coils. For example, a single coil could be positioned along a portion or the full longitudinal length of the pipe section. Alternatively, a single pair of coils may be positioned along a portion of the pipe section where each coil within the pair of coils is separated longitudinally along the pipe section so that the gap between each of the coils is at a predetermined distance. The predetermined distance may be calculated based on empirical results determining the distance that provides the most efficient cleaning process for various flow rates of the fluid. The distance between the coils may therefore enable the length of the generated field to be extended so as to provide increased likelihood of repeated targeting of particular particles when the particles are travelling at an increased flow rate through the pipe section.

Further, it will be understood that in cases where very high reliability is required such as in R.O. plants (or other membrane based treatment plants) where failures in the descaling plant can have expensive consequences in the membranes, the enhanced reliability for a given power delivery is already extant in the design of one or more of the herein described embodiments by virtue of its power saving design and therefore lower operating temperature. Additional reliability may be achieved via redundancy, that is, by having multiple coils, driven by multiple drive circuits with independent power supplies. Failure in any single unit, or even multiple units or power supplies, may not render the system ineffective. Infrequent maintenance is all that is required and if any single unit is found faulty, it may be replaced resulting in no consequent damage to the downstream equipment.

Further, it will be understood that in situations where conventional power is not easily available, one or more of the herein described embodiments may be solar powered. For example, a power economising scheme may be implemented specifically for use in conjunction with a solar power controller that is designed to utilise this feature. One or more of the herein described embodiments are specifically adapted to generate magnetic fields that are typically 10 times more powerful than is known to be effective. Therefore the field strength may be compromised without necessarily compromising function. This aspect may be exploited in achieving a very cost effective solar operation. Although the intent may still be to achieve the 10 times overdrive capability for up to 90% availability, for example, there may be times when solar power is compromised and so some level of effectiveness for a longer period of time is acceptable rather than to run at full power continuously and then abruptly cut power when it runs out.

The various embodiments described herein normally attempt to maintain a desired set point load current. An economising scheme operates by using a derating factor that is dependent on the overall supply voltage being supplied, such that at its nominal operating voltage of 24V (for example) the nominal set point load current AP used. However, if the voltage supply drops below the nominal operating voltage, then the nominal set point load current is derated or adjusted proportionately. For example, if the available voltage supply is halved, the set point load current may also be halved. Halving the current reduces the overall power consumption by a factor of four. In such a manner the unit may be operated over longer periods during solar outages. The philosophy behind this approach is that it is better to apply a lower current for a longer period than no current at all. Given that the ratio of usable voltage is 3:1 this means that continuous power draw may be reduced as much as 9:1, considerably extending operation off a single charge.

According to one embodiment, the controller may be adapted to determine whether the variable supply voltage developed for the AC drive circuit is at a maximum desired level, and, upon a negative determination, the controller is specifically adapted to adjust the voltage level of the supply provided to the AC drive circuit in order to reduce an initially developed target load current to a lower value target load current in response to the voltage level of the supply. For example, the second variable output (duty cycle controlled signal) from the controller may be adjusted to vary the supply voltage generated by the switch mode power supply circuit. In this way, the controller may reduce the initially developed target load current, for example by the same factor as the variable supply voltage has dropped from the maximum desired level. Alternatively, the target load current may be adjusted by the controller disproportionately when compared with the drop in the variable supply voltage. As a further alternative, the output of the general voltage supply to the system may be monitored to determine its present level and the second variable output (duty cycle controlled signal) may be adjusted accordingly by the controller based on the present level to reduce an initially developed target load current to a lower value target load current based on the detected change in the general voltage supply.

Further, it will be understood that by monitoring the current feedback loop, the current draw may be measured at different points in the frequency sweep cycle of the drive signal. Therefore, the system may be adapted to compensate for the change in reactance in the load due to the change in frequency by increasing the load current at that particular frequency. For example, the voltage level of the supply provided to the AC drive circuit may be adjusted by adjusting the pulse width modulated signal being developed by the controller and subsequently provided to the switch mode power supply.

The invention claimed is:

1. A fluid conditioning system with a target load current to generate an alternating magnetic field directed at a fluid, the control system comprising a controller, a switch mode power supply circuit and a push pull AC drive circuit,
wherein the controller is arranged to develop a first variable output having a frequency range that sweeps between a minimum frequency and a maximum frequency, and further arranged to develop a second variable output in the form of a duty cycle controlled signal,
wherein the switch mode power supply circuit is arranged to develop a variable voltage in response to the second variable output and a current sense circuit, wherein the variable voltage is used to feed a voltage supply of the AC drive circuit in response to the second variable output and a current sense circuit, and the AC drive circuit is arranged to develop a drive signal for developing a target load current in response to the first variable output and the variable supply voltage, thereby forming a current feedback loop by monitoring the output current of the switch mode power supply circuit.

2. The system of claim 1, wherein the AC drive circuit is an H-bridge circuit.

3. The system of claim 1, wherein the first variable output is a square wave signal.

4. The system of claim 1, wherein the second variable output is a pulse width modulated signal.

5. The system of claim 1, wherein the drive signal is a square wave signal having a frequency range that sweeps between a minimum frequency and a maximum frequency.

6. The system of claim 1, wherein the target load current is a target RMS load current.

7. The system of claim 1, wherein the current feedback loop is arranged to monitor a switched current output of the switch mode power supply circuit, where the variable supply voltage is based on the switched current output.

8. The system of claim 1, wherein the controller is further arranged to determine whether the variable supply voltage developed for the AC drive circuit is at a maximum desired level, and, upon a negative determination, arranged to adjust the second variable output to reduce an initially developed target load current to a lower value target load current based on a change in the variable supply voltage.

9. The system of claim 8, wherein the controller is further arranged to reduce the initially developed target load current by the same factor as the variable supply voltage has dropped from the maximum desired level.

10. The system of claim 1, wherein the switch mode power supply circuit is arranged to develop a variable supply voltage to the AC drive circuit to enable the AC drive circuit to develop the drive signal with the target load current to a load connected to the AC drive circuit when the load is approaching zero ohms.

11. The system of claim 1, wherein the controller is further arranged to adjust the developed variable supply voltage to the AC drive circuit based on the current feedback loop to counteract the variable reactance values generated in the one or more coils by virtue of the frequency range of the first variable output.

12. The system of claim 1 adapted to drive at least two coils in the fluid conditioning system, wherein each coil is separated by a predetermined distance.

13. A method of driving one or more coils in a fluid conditioning system with a target load current to generate an alternating magnetic field directed at a fluid, the method comprising the steps of:
developing, in a controller, a first variable output having a frequency range that sweeps between a minimum frequency and a maximum frequency, and developing, in the controller, a second variable output in the form of a duty cycle controlled signal,
developing, in a switch mode power supply circuit, a variable supply voltage in response to the second variable output and a current sense circuit, wherein the variable voltage is used to feed a voltage supply of a push pull AC drive circuit, and
developing, at the AC drive circuit, a drive signal to develop a target load current in response to the first variable output and the variable supply voltage thereby forming a current feedback loop by monitoring the output current of the switch mode power supply circuit.

14. The method of claim 13, further including the step of the current feedback loop monitoring a switched current output of the switch mode power supply circuit, where the variable supply voltage is based on the switched current output.

15. The method of claim 14, further including the step of the controller determining whether the variable supply voltage developed for the AC drive circuit is at a maximum desired level, and, upon a negative determination, adjusting the second variable output to reduce an initially developed constant load current to a lower value constant load current based on the drop in the variable supply voltage.

16. The method of claim 15, further including the step of the controller reducing the initially developed target load current by the same factor as the variable supply voltage has dropped from the maximum desired level.

17. The method of claim 13, further including the step of the switch mode power supply circuit developing the variable supply voltage to enable the AC drive circuit to develop the drive signal and apply it to a load connected to the AC drive circuit so the drive signal still maintains a target load current when the load impedance is approaching zero ohms.

18. The method of claim 17, where the load impedance is 100 milliohms or greater.

19. The method of claim 13, further including the step of the controller adjusting the developed variable supply voltage to the AC drive circuit based on the sensed current to counteract the variable reactance values generated in the one or more coils by virtue of the frequency range of the first variable output.

20. The method of claim 13 adapted to drive at least two coils in the fluid conditioning system, wherein each coil is separated by a predetermined distance.

21. A fluid conditioning system adapted to condition fluid in a bore hole, the system comprising at least one non metallic fluid pipe portion with one or more coils wrapped around the pipe portion, a drive system comprising a push pull AC drive circuit and a coil drive circuit, wherein the AC drive circuit is arranged to generate a drive signal having a target current and a frequency range that sweeps between a minimum frequency and a maximum frequency, wherein the drive system is arranged to transmit the drive signal from the coil drive circuit to induce the drive signal into the one or more coils for conditioning fluid that passes through the one or more coils.

22. The system of claim 21 wherein the AC drive circuit comprises the fluid conditioning control system of claim 1.

23. A method of conditioning fluid in a bore hole, the method comprising:
attaching at least one non metallic fluid pipe portion to a submersible pump, where the pipe portion has one or more coils wrapped around it,
inserting the pipe portion and pump into the bore hole,
generating a drive signal having a target current and a frequency range that sweeps between a minimum frequency and a maximum frequency, and
transmitting the generated drive signal to the one or more coils for conditioning fluid that passes through the one or more coils within the bore hole.

24. The method of claim 23, further comprising the method of claim 13.

25. A method of driving one or more coils in a fluid conditioning system with a target load current to generate an alternating magnetic field as a pre treatment of the fluid prior to membrane based fluid treatment, the method comprising the steps of:

developing, in a controller, a high frequency pulse width modulated input signal for a push pull AC drive circuit, wherein the input signal is modulated by a low frequency waveform that sweeps between a minimum frequency and a maximum frequency, developing a fixed voltage supply for the AC drive circuit, developing a load current output from the AC drive circuit based on the pulse width modulated signal and a current feedback signal, filtering the high frequency components of the output of the AC drive circuit to develop an output signal based on the low frequency waveform, applying the output signal to the one or more coils attached to a fluid conduit to pre-treat fluid for a membrane based fluid treatment system.

26. The method of claim 13, wherein the fluid conditioning system is used in conjunction with a membrane based fluid treatment system.

27. The method of claim 26, wherein the membrane based fluid treatment is one of reverse osmosis, nano-filtration, ultrafiltration and micro filtration fluid treatment.

* * * * *